Nov. 29, 1932.  J. L. THOMAS  1,889,503
ROTARY TYPE FLOAT VALVE
Filed Dec. 27, 1930  2 Sheets-Sheet 1

Inventor
J. L. Thomas
By Clarence A. O'Brien
Attorney

Nov. 29, 1932.   J. L. THOMAS   1,889,503
ROTARY TYPE FLOAT VALVE
Filed Dec. 27, 1930   2 Sheets-Sheet 2

Inventor
J. L. Thomas
By Clarence A. O'Brien
Attorney

Patented Nov. 29, 1932

1,889,503

UNITED STATES PATENT OFFICE

JACK LEE THOMAS, OF OKLAHOMA CITY, OKLAHOMA, ASSIGNOR OF ONE-FOURTH TO EMMETT T. BRUCE, ONE-FOURTH TO WILLIAM D. FAWCETT, AND ONE-FOURTH TO ELMER F. ROSS, ALL OF OKLAHOMA CITY, OKLAHOMA

ROTARY TYPE FLOAT VALVE

Application filed December 27, 1930. Serial No. 505,179.

This invention relates to improvements in float valves for well drilling apparatus, the general object of the invention being to provide a body adapted to be inserted in or connected with the drilling line and containing valve mechanism which is so constructed and arranged as to control the mud laden fluid passing through the line and in such a manner that wear of the parts is reduced to a minimum.

Another object of this invention is to so connect the line with the tool joint as to form a shoulder against which the body bears when the rotary pipe is to be floated into the well or when high pressure gas is encountered while drilling.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
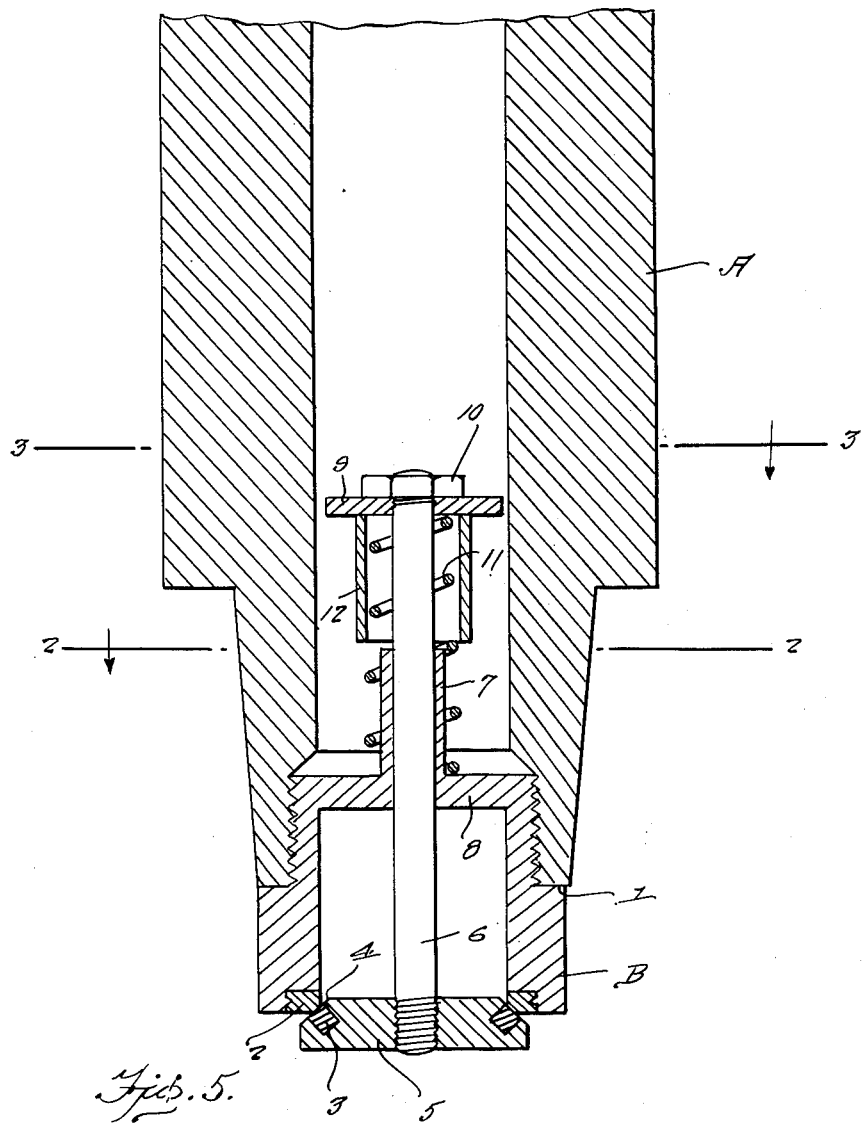
Figure 1 is a longitudinal sectional view through a part of the rotary pipe and showing the invention therein.
Figure 5:
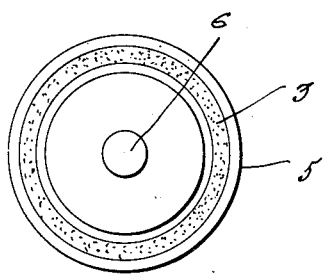
Figure 5 is a top plan view of the valve.
Figure 2:
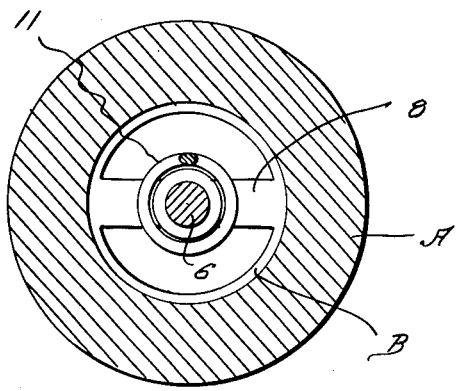
Figure 2 is a section on the line 2—2 of Figure 1.
Figure 3:
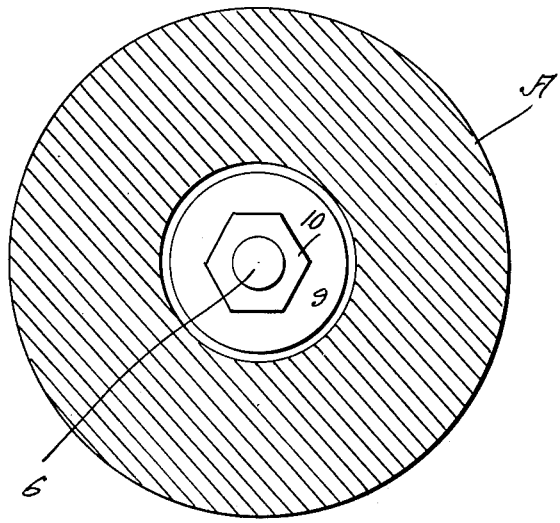
Figure 3 is a section on line 3—3 of Figure 1.
Figure 4:
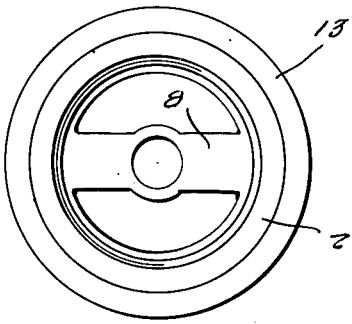
Figure 4 is a bottom plan view of the valve carrying body.

In the drawings, the letter A indicates the male end of the tool joint and the letter B indicates the body of the device forming the invention. This body has a reduced upper part which is threaded in a lower end of the joint, as shown in Figure 1 and the shoulder 1 is formed on the body at the juncture of its reduced part with the other part and this shoulder contacts the end of the joint as shown in Figure 1. A valve seat 2 is placed into the lower end of the body, this seat being preferably formed of steel and is engaged by a seat 3 preferably of rubber placed in an annular groove formed in the beveled face 4 of the valve 5, so that the seat 3 is diagonally arranged as shown. The stem 6 of the valve passes through an upstanding tubular guide 7 formed on the cross piece 8 at the top of the body B. A disk 9 is threaded to the top of the stem 6 and is locked in place by the nut 10. A spring 11 encircles the top part of the valve stem and also passes over the guide 7 and has its lower end resting upon the cross piece 8 and its upper end engaging the disk 9. A tubular cover part 12 depends from the disk 9 and encloses the top part of the spring when the valve is closed and when the valve is open this cover part will enclose the part of the spring encircling the guide stem and the lower end of the cover part engaging the cross piece 8 will act as a stop to limit downward movement of the opening of the valve.

From the foregoing it will be seen that the mud laden liquid passing downwardly through the member A will act on the disk 9 and force said disk and the valve part downwardly until the lower end of the guide 12 rests upon the body B, thus opening the valve and permitting the liquid to pass through the drilling line. Thus the member 12 covers the spring 11 and protects the same from wear while the mud laden liquid is passing through the device and as the area of the bore of member A less the area of the disk 9 is less than the area of the bore of the lower section (not shown) which is connected with the joint A less the area of the valve 5, the velocity pressure is greater between the disk 9 and the walls of the bore of member A than it is between the valve and the bore of the lower section. Thus this reduction of velocity removes most of the wear on the valve seats and the valve. The shoulder 1 takes the strain of the pressure exerted against the body B and the valve when the rotary pipe is being floated into the well or when high pressure gas is encountered while drilling.

Attention is also called to the fact that all the valve parts are carried by the body B.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus dscribed my invention, what I claim as new is:

1. In combination with the tool joint of a rotary drilling line, a valve body connected to the lower end of the male part of the joint and having a valve seat at its lower end, a valve engaging the seat, a stem connected with the valve and passing through the top part of the body which has an opening therein, a plate on the upper end of the stem of slightly less diameter than the bore of the joint to increase the velocity of the fluid passing the plate over that of the fluid passing the valve and a spring for normally holding the valve on its seat but permitting the valve to open under the pressure of fluid in the line acting on said plate.

2. In combination with a tool joint of a rotary drilling line, a valve body threaded in the lower end of the male part of the joint, and having a shoulder engaging the lower end of the male part of the joint, said body including a cross piece at its top, a valve seat at the lower end of the body at the inner circumference thereof, a valve having a seat in its top part engaging the first seat, a stem having its lower end connected with the valve, said stem passing through the cross piece, a guide on the cross piece through which the stem passes, a plate connected with the upper end of the stem, a spring encircling the guide and bearing against the plate for normally holding the valve in closed position, and a cover part depending from the plate and enclosing the top part of the spring, said cover part also enclosing the guide and the rest of the spring when the valve is in open position, the lower end of the cover plate engaging the cross piece to act as a stop for limiting the downward movement of the valve, said plate being of slightly less diameter than the bore of the male part whereby the velocity of the fluid passing the plate is greater than that of the fluid passing the valve.

In testimony whereof I affix my signature.

JACK LEE THOMAS.